US009723857B2

(12) United States Patent
Endo et al.

(10) Patent No.: US 9,723,857 B2
(45) Date of Patent: Aug. 8, 2017

(54) EFFERVESCENT BEVERAGE CONTAINING GRAIN DEGRADATION PRODUCT WITH REFRESHING FOAM

(75) Inventors: Norio Endo, Yokohama (JP); Shinobu Ueno, Yokohama (JP); Daiju Mizumoto, Yokohama (JP); Takafumi Asakura, Yokohama (JP); Hiroshi Shibata, Yokohama (JP)

(73) Assignee: KIRIN BEER KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/513,146

(22) PCT Filed: Feb. 10, 2012

(86) PCT No.: PCT/JP2012/053175
§ 371 (c)(1),
(2), (4) Date: Sep. 10, 2012

(87) PCT Pub. No.: WO2012/169226
PCT Pub. Date: Dec. 13, 2012

(65) Prior Publication Data
US 2013/0029022 A1 Jan. 31, 2013

(30) Foreign Application Priority Data

Jun. 7, 2011 (JP) .................................. 2011-127773
Jun. 8, 2011 (JP) .................................. 2011-128512
(Continued)

(51) Int. Cl.
*A23G 9/28* (2006.01)
*A23L 2/40* (2006.01)
(Continued)

(52) U.S. Cl.
CPC ............. *A23G 9/281* (2013.01); *A23G 9/045* (2013.01); *A23G 9/20* (2013.01); *A23L 2/40* (2013.01); *A23P 30/40* (2016.08); *C12C 11/11* (2013.01)

(58) Field of Classification Search
CPC A01N 25/16; A23V 2250/10; A23V 2300/20; A47J 31/4496; A47J 43/127;
(Continued)

(56) References Cited

U.S. PATENT DOCUMENTS 3,608,779 A 9/1971 Cornelius
3,922,361 A 11/1975 Vann
(Continued)

FOREIGN PATENT DOCUMENTS

CN 1384873 12/2001
CN 101766294 7/2010
(Continued)

OTHER PUBLICATIONS

Disney's Frozen Beer, In a Blue Sky Mood!, http://kazu-senna.at.webry.info/201109/article_19.html (Sep. 12, 2011).
(Continued)

*Primary Examiner* — Jill Warden
*Assistant Examiner* — Hong T Yoo
(74) *Attorney, Agent, or Firm* — Sughrue Mion, PLLC

(57) ABSTRACT

An effervescent beverage containing a grain degradation product which contains creamy and tasty foam having a refreshing texture and a new texture of a prolonged creamy-foam retention is formed on the effervescent beverage upon drinking, a method for dispensing and a dispenser of such effervescent beverage are disclosed. According to the present invention, there is provided a method for dispensing the effervescent beverage containing a grain degradation product by cooling the effervescent beverage and pouring it into
(Continued)

a vessel to serve, wherein foam having a snow-like refreshing texture and a new texture of a prolonged creamy-foam retention is formed on the effervescent beverage, said method comprising:

forming a slurry containing the extract-frozen microparticles by cooling and stirring the effervescent beverage, preparing the frozen foam of the effervescent beverage containing the extract-frozen microparticles and fine bubbles by cooling and stirring the slurry and incorporating the outside gas into the slurry, and supplying the prepared frozen foam of the effervescent beverage to the effervescent beverage poured into a vessel as a foam component.

6 Claims, 6 Drawing Sheets

(30) Foreign Application Priority Data

Feb. 9, 2012 (JP) .................................. 2012-26552
Feb. 9, 2012 (JP) .................................. 2012-26572

(51) Int. Cl.
*A23G 9/04* (2006.01)
*A23G 9/20* (2006.01)
*C12C 11/11* (2006.01)
*A23P 30/40* (2016.01)

(58) Field of Classification Search
CPC ........ A47J 43/0711; A47J 31/36; A47J 31/40; A23L 1/0097; A23L 2/40; A23G 9/20; A23G 9/045; A23G 9/281; A23G 9/46; A23G 1/52

See application file for complete search history.

(56) References Cited

U.S. PATENT DOCUMENTS

| | | | | |
|---|---|---|---|---|
| 4,610,888 | A | * | 9/1986 | Teng et al. .................. 426/569 |
| 5,615,559 | A | | 4/1997 | Kress et al. |
| 6,119,467 | A | | 9/2000 | Zusman et al. |
| 6,138,995 | A | * | 10/2000 | Page ............................ 261/43 |
| 6,974,598 | B2 | * | 12/2005 | Scullion et al. ............. 426/592 |
| 2002/0083730 | A1 | | 7/2002 | Giroux et al. |
| 2003/0161925 | A1 | | 8/2003 | Scullion et al. |
| 2003/0211219 | A1 | | 11/2003 | Scullion et al. |
| 2006/0051483 | A1 | | 3/2006 | Watanabe et al. |
| 2007/0248736 | A1 | | 10/2007 | Masuda et al. |
| 2009/0092724 | A1 | | 4/2009 | Mattie |
| 2009/0196973 | A1 | * | 8/2009 | Piatko .................. A23C 11/08 426/565 |
| 2009/0241559 | A1 | | 10/2009 | Dale |
| 2010/0276444 | A1 | | 11/2010 | Belcham |

FOREIGN PATENT DOCUMENTS

| | | | |
|---|---|---|---|
| EA | 003810 | B1 | 10/2003 |
| EP | 0 280 432 | A | 8/1988 |
| EP | 1889544 | A1 | 2/2008 |
| JP | 47-14360 | A | 8/1972 |
| JP | 4714360 | | 8/1972 |
| JP | 49-001784 | A | 1/1974 |
| JP | 49-1784 | A | 1/1974 |
| JP | 491784 | | 1/1974 |
| JP | 52-1070 | A | 1/1977 |
| JP | 521070 | | 1/1977 |
| JP | 52-15864 | A | 2/1977 |
| JP | 5215864 | | 2/1977 |
| JP | 55-40229 | B1 | 10/1980 |
| JP | 5540229 | | 10/1980 |
| JP | 61-88869 | A | 5/1986 |
| JP | 63039550 | | 2/1988 |
| JP | 10-287393 | A | 10/1988 |
| JP | 63-301779 | A | 12/1988 |
| JP | 63301779 | | 12/1988 |
| JP | 02100665 | | 4/1990 |
| JP | 3-219865 | A | 9/1991 |
| JP | 3219865 | | 9/1991 |
| JP | 11-299473 | A | 11/1999 |
| JP | 2000-163651 | A | 6/2000 |
| JP | 2000163651 | | 6/2000 |
| JP | 2002-538844 | A | 11/2002 |
| JP | 2003-514553 | A | 4/2003 |
| JP | 2003-187320 | A | 7/2003 |
| JP | 2003187320 | | 7/2003 |
| JP | 2004-016108 | A | 1/2004 |
| JP | 2004016108 | | 1/2004 |
| JP | 2004-81171 | A | 3/2004 |
| JP | 2005-124591 | A | 5/2005 |
| JP | 2005-328729 | A | 12/2005 |
| JP | 2005-328751 | A | 12/2005 |
| JP | 2006-191934 | A | 7/2006 |
| JP | 2006-314282 | A | 11/2006 |
| JP | 2007-82538 | A | 4/2007 |
| JP | 2007-97483 | A | 4/2007 |
| JP | 200797483 | | 4/2007 |
| JP | 2009-514744 | A | 4/2009 |
| JP | 2010-022784 | A | 2/2010 |
| JP | 2010022784 | | 2/2010 |
| RU | 2357640 | C2 | 6/2009 |
| TW | 200936487 | | 9/2009 |
| WO | 99/26486 | A1 | 6/1999 |
| WO | 00/56163 | A1 | 9/2000 |
| WO | 01/36582 | A1 | 5/2001 |
| WO | 0136582 | A1 | 5/2001 |
| WO | 03/105610 | A1 | 12/2003 |
| WO | 2007/052031 | A2 | 5/2007 |
| WO | 2008/019444 | A1 | 2/2008 |
| WO | 2009/037446 | A2 | 3/2009 |

OTHER PUBLICATIONS

Adult Refreshments, Rolling Acorns Disney Journal, http://dongoro.blog.so-net.ne.jp (Aug. 17, 2011).
Where are they Selling Frozen Beer?, Disney Resort Neighborhood Story, http://fantastic-nako/entry-10978420798.html (Aug. 10, 2011).
Written Opinion for JP2011-211253 (Nov. 10, 2011).
The Explanation of Circumstances (Written Opinion) and Manual of TwinIce for JP2011-211253 (Nov. 11, 2011).
Office Action of JP2011-211253 (Nov. 29, 2011).
An Argument for JP2011-211253 (Dec. 28, 2011).
An Amendment for JP2011-211253 (Dec. 28, 2011).
International Search Report and Written Opinion for PCT/JP2011/072100 (Nov. 8, 2011).
Written Opinion for JP2012-026572 (Feb. 22, 2012).
Explanation of Circumstances concerning Accelerated Examination (Written Opinion) for JP2012-026572 (Feb. 23, 2012).
Office Action of JP2012-026572 (Mar. 13, 2012).
An Argument for JP2012-026572 (Apr. 12, 2012).
International Search Report and Written Opinion for PCT/JP2012/053181 (Mar. 19, 2012).
An Amendment for JP2012-026572 (Apr. 12, 2012).
An Amendment for JP2012-026572 (Feb. 22, 2012).
An Amendment for JP2011-211253 (Nov. 10, 2011).
Written Opinion for JP2012-026552 (Mar. 2, 2012).
Office Action of JP2012-026552 (Mar. 23, 2012).
An Amendment for JP2012-026552 (Apr. 12, 2012).
An Argument for JP2012-026552 (Apr. 12, 2012).
An Amendment for JP2011-211253 submitted Dec. 28, 2011.
An Amendment for JP2012-026572 submitted Apr. 12, 2012.
An Amendment for JP2012-026572 submitted Feb. 22, 2012.
An Amendment for JP2011-211253 submitted Nov. 10, 2011.
International Search Report for PCT/JP2012/064722 dated Sep. 11, 2012.

(56) References Cited

OTHER PUBLICATIONS

Written Opinion for PCT/JP2012/064722 dated Jul. 2009.
International Search Report for PCT/JP2012/053175 dated Mar. 6, 2012.
Chinese Office Action for CN Application No. 201180013640.0 issued Jul. 31, 2013.
Chinese Office Action for CN Application No. 201280000332.9 issued on Aug. 7, 2013.
Chinese Office Action for CN Application No. 201280000919.X dated Aug. 9, 2013.
Taiwanese Office Action for TW Application No. 101119604 issued Aug. 22, 2013.
Office Action issued in counterpart Chinese Patent Application No. 201180013640.0, dated Jan. 30, 2014.
Office Action issued in counterpart Russian Patent Application No. 2013115884/10(023612), dated Feb. 7, 2014.
International Preliminary Report on Patentability issued in PCT Application No. PCT/JP2012/053175, dated Dec. 27, 2013.
Office Action issued in Chinese Patent Application No. 201180013640.0, dated Oct. 11, 2013.
Office Action issued in Chinese Patent Application No. 201280000919.X, dated Dec. 6, 2013.
Office Action issued in Chinese Patent Application No. 201280000332.9, dated Dec. 23, 2013.
European Search Report issued in European Patent Application No. 12756636.2, dated Dec. 2, 2013.
Office Action issued in counterpart Australian Patent Application No. 2012265703, issued Mar. 20, 2014.
Office Action issued in counterpart Russian Patent Application No. 2013115884/10(023612), dated Apr. 23, 2013.
Office Action, dated Aug. 11, 2014, issued by the Chinese Patent Office in counterpart Chinese Patent Application No. 201180013640.0.
Patent Examination Report, dated Jul. 16, 2014, issued by the Australian Patent Office in counterpart Australian Application No. 2012265703.
Office Action issued in counterpart Chinese Patent Application No. 201280000919.X, dated May 5, 2014.
Office Action issued in counterpart Chinese Patent Application No. 201280000332.9, dated May 13, 2014.
"Slush draft beer, 'essential differentiating element that beer halls are expected to have in the summer,'" Jun. 14, 2011, Money Today, accessible at <http://news.naver.com/main/tool/print.nhn?oid=008&aid=0002554951>.
"Super Beer Slush Maker Manual," published by SE-A Incorporated before May 2002.
"Ice Draft Beer," published by SE-A Incorporated before May 2002.
"Slush draft beer makes the best use of unique taste of beer," Jan. 9, 2011, Money Today, accessible at <http://news.naver.com/main/tool/print.nhn?oid=008&aid=0002459180>.
"Differentiation of draft beer," Mar. 22, 2011, Money Today, accessible at <http)://news.naver.com/main/tool/print.nhn?oid=008&aid=0002503797>.
"Conquer extremely hot days with new concept slush beer!," Jul. 9, 2010, Money Today, accessible at <http://news.naver.com/main/tool/print.nhn?oid=008&aid=0002360962>.
"Decision on Trial," issued May 2015, by the Korean Intellectual Property Tribunal in Korean Patent No. 1244505.
Decision on Trial, issued by the Korean Intellectual Property Tribunal in counterpart Korean Patent No. 1244505, in response to Demand for Invalidation Trial of Aug. 17, 2015.
Office Action dated Jan. 27, 2014, issued by the European Patent Office in counterpart EP Application No. 12756636.2.
Office Action dated Mar. 12, 2015, issued by the European Patent Office in counterpart EP Application No. 12756636.2.
Communication, dated May 10, 2016, issued by the Japanese Patent Office in counterpart Japanese Patent Application No. 2013-519534.
Communication, dated Mar. 25, 2016, issued by the Japanese Patent Office in counterpart Japanese Patent Application No. 2012-130146.

* cited by examiner

EFFERVESCENT BEVERAGE CONTAINING GRAIN DEGRADATION PRODUCT WITH REFRESHING FOAM

CROSS-REFERENCE TO RELATED APPLICATION

This application is a National Stage of International Application No. PCT/JP2012/053175 filed Feb. 10, 2012, claiming priority based on Japanese Patent Application No. 127773/2011 filed on Jun. 7, 2011, Japanese Patent Application No. 128512/2011 filed on Jun. 8, 2011, Japanese Patent Application No. 26552/2012 filed on Feb. 9, 2012 and Japanese Patent Application No. 26572/2012 filed on Feb. 9, 2012, the entire disclosure of which is incorporated herein by reference.

BACKGROUND OF THE INVENTION

Field of the Invention

The present invention relates to an effervescent beverage containing a grain degradation product, a method for dispensing and a dispensing device for the effervescent beverage, wherein the effervescent beverage contains frozen foam prepared by cooling and stirring the effervescent beverage liquid and incorporating outside gas, wherein foam having a snow-like refreshing texture and a new texture of a prolonged creamy-foam retention is formed on the effervescent beverage.

Background Art

Property of the foam is one of the important factors pertaining to the palatability of effervescent beverage such as beer. Major functions of the foam of beer and the like include prevention of outgassing of carbon dioxide from the beverage, flavoring by foaming, prevention of degradation by capping, comfortable bursting sound of the foam, tasty appearance, etc. Therefore, improvement of foam retention of the beverage such as beer is effective to appeal to consumers. In the field of effervescent alcoholic beverage such as beer, the beverage having creamy and sustainable foam has been preferred. Therefore, various methods have been disclosed in order to improve such foam.

Effervescent alcoholic beverages containing foaming agent or foam-retaining agent aiming at enhancing stable foam-forming or providing sustainable and lasting foam have been disclosed in order to improve the foam of the effervescent beverage such as beer. For example, effervescent alcoholic beverage containing a saponin component (Japanese Patent Laid-Open Publication No. 88869/1986, No. 191934/2006, No. 314282/2006), beer-like cold beverage containing guarana extract, foaming agent and coloring agent (Japanese Patent Laid-Open Publication No. 82538/2007), and carbon dioxide-containing alcoholic beverage containing malt fermentation liquor containing hop, foaming agent (saponin) and foam-retaining agent (thickening-stabilizing agent such as agar, gelatin, xanthan gum, carrageenan, pectin, tamarind gum, gellan gum, locust bean gum, etc.) (Japanese Patent Laid-Open Publication No. 299473/1999) have been disclosed.

In addition, beer-like alcoholic beverage obtained by preparing a pre-fermentation liquor using a nitrogen source obtained from soybean or pea as a raw material mixed with a foaming agent and/or foam-retaining agent selected from a group consisting of plant-derived saponin-based substance such as soybean saponin, yucca saponin, quillaja saponin, tea saponin, Goryeo saponin; proteinaceous substance such as egg-white peptide, bovine serum albumin; thickener such as xanthan gum, pullulan, guar gum, locust bean gum, carrageenan, Arabia gum, tamarind seed polysaccharide, agar, Tara gum, gellan gum; and alginate ester (Japanese Patent Laid-Open Publication No. 124591/2005), fermented malt beverage made using wheat degradation product (Japanese Patent Publication Laid-Open No. 328729/2005), and carbon dioxide-containing beverage made using octenylsuccinic acid starch (Japanese Patent Laid-Open Publication No. 81171/2004; WO 03/105610), etc. have been disclosed. Further, addition of nitrogen gas to beverage such as beer in order to improve foam retention of the beverage (Japanese Patent Laid-Open Publication No. 287393/1998) has been disclosed.

On one hand, effervescent alcoholic beverages such as beer are usually chilled before drinking. Therefore, the beverage should be cold when served at restaurant or bar. However, cold beverages tend to worsen foaming because carbon dioxide is likely to dissolve in the beverage. Furthermore, the gas in the foam tends to inflate and collapse resulting in poor foaming, because there is a large temperature difference between the ambient air and the cold beverage such as beer. Therefore, serving a beverage such as beer with sustainable foam at low temperature upon drinking is an important requirement to appeal to consumers. In order to meet such requirement, various foaming agents and foam-retaining agents have been proposed aiming at enhancing stable foam-forming or providing sustainable and lasting foam even at low temperature upon drinking for effervescent alcoholic beverage such as beer, as mentioned above. However, when effervescent beverage with creamy and sustainable foam is produced using such foaming agent and foam-retaining agent, the foaming agent or foam-retaining agent themselves may influence the intrinsic taste of the effervescent beverage or retention of creamy foam may spoil the refreshing taste of the foam itself and influence the taste of the effervescent beverage for which refreshing feeling is preferred.

On the other hand, a method to serve frozen and finely crashed beverage such as beer floating over beer has been disclosed as a method for dispensing the cold beverage by pouring it into a vessel to serve upon drinking (Japanese Patent Laid-Open Publication No. 514553/2003). The beverage of this disclosure contains a frozen beverage solid or a mixture of the beverage liquid and the frozen beverage solid floating over the effervescent beverage such as beer poured into a vessel such as a glass. There is foam of carbon dioxide or the like, which has been dissolved in the effervescent beverage, existing over the frozen beverage solid. Although the frozen beverage solid or the mixture of the beverage liquid and the frozen beverage solid is floating over the effervescent beverage poured in the vessel, the frozen beverage solid itself neither forms soft foam, nor enhances the foam retention effect of the effervescent beverage poured in the vessel.

In addition, WO2009/037446 discloses a method for dispensing and an apparatus for dispensing, by which cold beverage such as beer and cider, wherein the chilled beverage is served in a state containing chilled beverage/frozen particle using a freezer. According to the disclosure, the chilled beverage served by this method for dispensing can keep the cold state without diluting due to the frozen particles contained in the beverage. The disclosure also claims that the beverage containing the frozen particles is served with slush consistency.

PRIOR ART REFERENCES

Patent Documents

[Patent Document 1] Japanese Patent Laid-Open Publication No. 88869/1986
[Patent Document 2] Japanese Patent Laid-Open Publication No. 287393/1998
[Patent Document 3] Japanese Patent Laid-Open Publication No. 299473/1999
[Patent Document 4] Japanese Patent Laid-Open Publication No. 81171/2004
[Patent Document 5] Japanese Patent Laid-Open Publication No. 124591/2005
[Patent Document 6] Japanese Patent Laid-Open Publication No. 328729/2005
[Patent Document 7] Japanese Patent Laid-Open Publication No. 191934/2006
[Patent Document 8] Japanese Patent Laid-Open Publication No. 314282/2006
[Patent Document 9] Japanese Patent Laid-Open Publication No. 82538/2007
[Patent Document 10] Japanese Patent Laid-Open Publication No. 514553/2003
[Patent Document 11] WO03/105610 [Patent Document 12] WO2009/037446

SUMMARY OF THE INVENTION

Problems to be Solved by the Invention

The problems to be solved by the present invention is to provide an effervescent beverage containing a grain degradation product, comprising a fermented alcoholic beverage consisting of beer, low-malt beer and other brewed alcoholic beverages, or a non-alcoholic malt beverage, a method for dispensing and a dispensing device for the effervescent beverage, wherein tasty foam having a refreshing texture and a new texture of a prolonged creamy-foam retention is formed on the effervescent beverage upon drinking.

Means to Solve the Problems

As a result of extensive investigation to solve the above-mentioned problem and to propose an effervescent beverage which contains tasty foam having a refreshing texture and a new texture of a prolonged creamy-foam retention upon drinking, the present inventor has found that the above-mentioned problem could be solved by forming slurry containing extract-frozen microparticles by cooling and stirring the effervescent beverage liquid containing a grain degradation product, then preparing the frozen foam of the effervescent beverage containing the extract-frozen microparticles and fine bubbles by cooling and stirring the slurry and incorporating the outside gas into the slurry, and supplying the prepared frozen foam of the effervescent beverage to the effervescent beverage poured into a vessel as a foam component. The present invention is based on this finding.

Thus, the present invention provides a method for dispensing an effervescent beverage containing a grain degradation product by cooling the effervescent beverage and pouring it into a vessel to serve, wherein foam having a snow-like refreshing texture and a new texture of a prolonged creamy-foam retention is formed on the effervescent beverage, said method comprising:

forming a slurry containing extract-frozen microparticles by cooling and stirring an effervescent beverage liquid,
preparing the frozen foam of the effervescent beverage containing extract-frozen microparticles and fine bubbles by cooling and stirring the slurry and incorporating the outside gas into the slurry, and
supplying the prepared frozen foam of the effervescent beverage to the effervescent beverage poured into a vessel as a foam component.

The mechanism by which the foam having a refreshing texture and a new texture of a prolonged creamy-foam retention is formed in the present invention is not clear but considered as follows. When an effervescent beverage liquid containing a grain degradation product such as beer is stirred under cooling, water in the liquid is frozen first. When water is frozen, the temperature will once rise due to the heat of solidification, then drop. In addition, freezing of water will result in concentration of the extract and increase in viscosity. Subsequent cooling and stirring will make ambient air (outside air) incorporated due to the increased viscosity, resulting in occurrence of cubical expansion. Since the air (outside air) incorporated in this process has a lower thermal conductivity than the beverage liquid, the temperature drop will become slower and an inflection point of the temperature drop tendency will appear at the time point of the start of incorporating the air (outside air). Further continuation of cooling and stirring with incorporating of outside gas will form the frozen foam of the effervescent beverage with the ambient air (outside air) incorporated to saturation. The frozen foam of the effervescent beverage is composed of the microparticles of frozen water in the beverage liquid, microparticles of extract-frozen in the beverage liquid, and microparticles of the air (outside air), the foam having a snow-like refreshing texture and a new texture of a prolonged creamy-foam retention is formed on the effervescent beverage upon drinking.

In the method for dispensing the effervescent beverage containing a grain product of the present invention, treatment to form the slurry containing the extract-frozen microparticles by cooling and stirring the effervescent beverage liquid, and to prepare the frozen foam of the effervescent beverage containing the extract-frozen microparticles and fine bubbles by cooling and stirring the slurry and incorporating the outside gas into the slurry may be performed using cooling and stirring units which are equipped with a cooling cylinder and a stirring blade.

In addition, in the method for dispensing the effervescent beverage containing a grain degradation product of the present invention, the treatment to prepare the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas into the slurry is controlled based on viscosity, temperature, cubical expansion rate or brightness of the prepared frozen foam of the effervescent beverage. When the treatment to prepare the frozen foam of the effervescent beverage containing the extract-frozen microparticles and fine bubbles is controlled based on viscosity, the viscosity of the prepared frozen foam of the effervescent beverage is adjusted to 0.4 Pa·s to 30 Pa·s.

In addition, when the treatment to prepare the frozen foams of the effervescent beverage is controlled based on temperature, the temperature of the frozen foam of the effervescent beverage is adjusted to −15° C. to −1.8° C. When the treatment to prepare the frozen foam of the effervescent beverage is controlled based on cubical expansion rate, the cubical expansion rate of the prepared frozen foam of the effervescent beverage is adjusted to 1.3 to 3.5. When the treatment to prepare the frozen foam of the effervescent beverage is controlled based on brightness, the difference of the brightness between the prepared frozen foam of the effervescent beverage and the effervescent beverage before freezing: ΔL is adjusted to 8 to 45.

In the method for dispensing the effervescent beverage containing a grain degradation product of the present invention, the treatment to prepare the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas into the slurry may be performed using atmospheric air or gas obtained by substituting a part or whole of the atmospheric air with nitrogen, as the outside gas.

In the method for dispensing the effervescent beverage containing a grain degradation product of the present invention, the effervescent beverage may comprise a fermented alcoholic beverage consisting of beer, low-malt beer and other brewed alcoholic beverages, or non-alcoholic malt beverage.

The present invention also encompasses a dispenser (dispensing device) for serving the effervescent beverage containing a grain degradation product which contains the foam having a snow-like refreshing texture and a new texture of a prolonged creamy-foam retention. The dispenser comprises a chilled-beverage dispensing device and a foam-dispensing device. The effervescent beverage liquid delivered from a transportation vessel of the effervescent beverage is chilled and poured into a vessel by the chilled-beverage dispensing device. The foam-dispensing device comprises a unit which forms slurry containing the extract-frozen microparticles by cooling and stirring the effervescent beverage liquid, a unit which prepares the frozen foam of the effervescent beverage containing the extract-frozen microparticles and fine bubbles by cooling and stirring the slurry and incorporating the outside gas into the slurry, a unit which detects the preparation of the frozen foam of the effervescent beverage containing the extract-frozen microparticles and fine bubbles formed by cooling and stirring the slurry and incorporating the outside gas into the slurry, and a unit which supplies the prepared frozen foam of the effervescent beverage to the effervescent beverage poured into a vessel as a foam component.

In the foam-dispensing device, the unit which forms slurry containing the extract-frozen microparticles by cooling and stirring the effervescent beverage liquid, and a preparing part which prepares the frozen foam of the effervescent beverage containing the extract-frozen microparticles and fine bubbles by cooling and stirring the slurry and incorporating the outside gas into the slurry may be constructed from a cooling and stirring chamber equipped with a cooling cylinder and a stirring blade. A screw type stirring blade may be used as the stirring blade of the cooling and stirring chamber.

The cooling and stirring chamber of the foam-dispensing device of the present invention equipped with the cooling cylinder and the stirring blade may be equipped with a nitrogen gas inlet unit which is connected to a nitrogen gas cylinder in order to substitute a part or whole of the atmospheric air in the chamber with nitrogen. Foam sustaining effect of the beverage dispensed can be enhanced by forming the frozen foam containing the extract-frozen microparticles of the effervescent beverage and fine bubbles using the outside gas containing nitrogen.

In the foam-dispensing device of the present invention, the unit which detects the preparation of the frozen foam of the effervescent beverage containing the extract-frozen microparticles and fine bubbles formed by cooling and stirring the slurry and incorporating the outside gas into the slurry may comprise the unit which detects viscosity, temperature, cubical expansion rate or brightness. The unit which detects the viscosity of the frozen foam of the effervescent beverage containing the extract-frozen microparticles and fine bubbles formed by cooling and stirring the slurry and incorporating the outside gas into the slurry may comprises a viscosity detection sensor.

In the foam-dispensing device of the present invention, an outlet of pouring nozzle for pouring the bubbles (frozen foam) composed of the extract-frozen microparticles of the effervescent beverage prepared and fine bubbles into a vessel may have plural small openings. The frozen foam of the effervescent beverage to be poured out become finer by using the outlet which has plural small openings.

The dispenser of the present invention comprises the chilled-beverage dispensing device which cools the effervescent beverage delivered from the transportation vessel of the effervescent beverage by the cooling unit and allows it to be poured into a vessel and the foam-dispensing device which pours the prepared frozen foam of the effervescent beverage by cooling and stirring the effervescent beverage liquid delivered from the transportation vessel of the effervescent beverage and incorporating the outside gas, and the effervescent beverage is delivered from a common transportation vessel or from individual transportation vessels respectively provided. When the common transportation vessel is used, the same effervescent beverage is used for the chilled-beverage dispensing device and the foam-dispensing device. When the individual transportation devices are used, different liquid types of the effervescent beverage can be used for the chilled-beverage dispensing device and the foam-dispensing device.

Thus, specifically, the present invention provides:
(1) a method for dispensing an effervescent beverage containing a grain degradation product by cooling the effervescent beverage and pouring it into a vessel to serve, wherein foam having a snow-like refreshing texture and a new texture of a prolonged creamy-foam retention is formed on the effervescent beverage, said method comprising:

forming slurry containing extract-frozen microparticles by cooling and stirring the effervescent beverage liquid, preparing the frozen foam of the effervescent beverage containing extract-frozen microparticles and fine bubbles by cooling and stirring the slurry and incorporating outside gas into the slurry, and supplying the prepared frozen foam of the effervescent beverage to the effervescent beverage poured into a vessel as a foam component, and (2) the method for dispensing an effervescent beverage containing the grain degradation product according to the above (1), wherein the treatment to form the slurry containing the extract-frozen microparticles by cooling and stirring the effervescent beverage liquid, and to prepare the frozen foam of the effervescent beverage containing the extract-frozen microparticles and fine bubbles by cooling and stirring the slurry and incorporating the outside gas into the slurry is performed using cooling and stirring units which are equipped with a cooling cylinder and a stirring blade.

The present invention also provides:

(3) the method for dispensing effervescent beverage containing the grain degradation product according to the above (1) or (2), wherein the treatment to prepare the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas into the slurry is controlled based on viscosity, temperature, cubical expansion rate or brightness of the prepared frozen foam of the effervescent beverage, (4) the method for dispensing effervescent beverage containing the grain degradation product according to the above (3), wherein the viscosity of the prepared frozen foam of the effervescent beverage is adjusted to 0.4 Pa·s to 30 Pa·s, (5) the method for dispensing effervescent beverage containing the grain degradation product according to the above (3), wherein the viscosity of the prepared frozen foam of the effervescent beverage is adjusted to 1.5 Pa·s to 9 Pa·s, (6) the method for dispensing effervescent beverage containing the grain degradation product according to the above (3), wherein the temperature of the prepared frozen foam of the effervescent beverage is adjusted to $-15°$ C. to $-1.8°$ C., (7) the method for dispensing effervescent beverage containing the grain degradation product according to the above (3), wherein the temperature of the prepared frozen foam of the effervescent beverage is adjusted to $-8°$ C. to $-2.5°$ C., (8) the method for dispensing effervescent beverage containing the grain degradation product according to the above (3), wherein the cubical expansion rate of the prepared frozen foam of the effervescent beverage is adjusted to 1.3 to 3.5, (9) the method for dispensing effervescent beverage containing the grain degradation product according to the above (3), wherein the cubical expansion rate of the prepared frozen foam of the effervescent beverage is adjusted to 2 to 3.5,

(10) the method for dispensing effervescent beverage containing the grain degradation product according to the above (3), wherein the difference of the brightness between the prepared frozen foam of the effervescent beverage and the effervescent beverage before freezing: $\Delta L$ is adjusted to 8 to 45,

(11) the method for dispensing effervescent beverage containing the grain degradation product according to the above (3), wherein the difference of the brightness between the prepared frozen foam of the effervescent beverage and the effervescent beverage before freezing: $\Delta L$ is adjusted to 30 to 45,

(12) the method for dispensing effervescent beverage containing the grain degradation product according to any of the above (1) to (11), wherein the treatment to prepare the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas into the slurry is performed using atmospheric air or gas obtained by substituting a part or whole of the atmospheric air with nitrogen, as the outside gas, and

(13) the method for dispensing effervescent beverage containing the grain degradation product according to any of the above (1) to (12), wherein the effervescent beverage containing a grain degradation product comprise a fermented alcoholic beverage consisting of beer, low-malt beer and other brewed alcoholic beverages, or a non-alcoholic malt beverage.

The present invention also provides:

(14) a dispenser of an effervescent beverage containing a grain degradation product, wherein the effervescent beverage is delivered from a transportation vessel of the effervescent beverage, cooled by a cooling unit and poured into a vessel, and wherein foam having a snow-like refreshing texture and a new texture of a prolonged creamy-foam retention is formed on the effervescent beverage, wherein the dispenser is equipped with a chilled-beverage dispensing device which cools the effervescent beverage delivered from a transportation vessel of the effervescent beverage and to allows it to be poured into a vessel and a foam-dispensing device equipped with:

a unit which forms slurry containing extract-frozen microparticles by cooling and stirring the effervescent beverage liquid delivered from the transportation vessel of the effervescent beverage, a unit which prepares the frozen foam of the effervescent beverage containing extract-frozen microparticles and fine bubbles by cooling and stirring the slurry and incorporating the outside gas into the slurry, a unit which detects the preparation of the frozen foam of the effervescent beverage containing the extract-frozen microparticles and fine bubbles formed by cooling and stirring the slurry, involving the outer gas into the slurry, and a unit which supplies the prepared frozen foams of the effervescent beverage to the effervescent beverage poured into a vessel as a foam component.

The present invention also provides:

(15) the dispenser of the effervescent beverage containing the grain degradation product according to the above (14), wherein the unit which forms slurry containing the extract-frozen microparticles by cooling and stirring the effervescent beverage liquid, and the preparing part which prepares the frozen foam of the effervescent beverage containing the extract-frozen microparticles and fine bubbles by cooling and stirring the slurry and incorporating the outside gas into the slurry, in the foam-dispensing device is constructed from a cooling and stirring chamber equipped with a cooling cylinder and a stirring blade,

(16) the dispenser of the effervescent beverage containing the grain degradation product according to the above (15), wherein the stirring blade of the cooling and stirring chamber equipped with the cooling cylinder and the stirring blade is a screw type stirring blade,

(17) the dispenser of the effervescent beverage containing the grain degradation product according to the above (15), wherein the cooling and stirring chamber equipped with the cooling cylinder and the stirring blade is equipped with a nitrogen gas inlet unit which is connected to a nitrogen gas cylinder,

(18) the dispenser of the effervescent beverage containing the grain degradation product according to the above (14), wherein the unit which detects the preparation of the frozen foam of the effervescent beverage containing the extract-frozen microparticles and fine bubbles formed by cooling and stirring the slurry and incorporating the outside gas into the slurry is a unit which detects viscosity, temperature, cubical expansion rate or brightness of the prepared frozen foam of the effervescent beverage,

(19) the dispenser of the effervescent beverage containing the grain degradation product according to the above (18), wherein the unit which detects the viscosity of the frozen foam of the effervescent beverage containing the extract-frozen microparticles and fine bubbles formed by cooling and stirring the slurry and incorporating the outside gas into the slurry comprises a viscosity detection sensor to detect the viscosity of the frozen foams of the effervescent beverage,

(20) the dispenser of the effervescent beverage containing the grain degradation product according to the above (14), wherein in the foam-dispensing device an outlet of pouring nozzle for pouring the bubbles composed of the prepared frozen foam of the effervescent beverage into a vessel has plural small openings, and

(21) the dispenser of the effervescent beverage containing the grain degradation product according to the above (14), comprising the chilled-beverage dispensing device which cools the effervescent beverage delivered from the transportation vessel of the effervescent beverage by the cooling unit and to allows it to be poured into a vessel and the foam-dispensing device which pours the frozen foam of the effervescent beverage prepared by cooling and stirring the effervescent beverage liquid delivered from the transportation vessel of the effervescent beverage and incorporating the outside gas, wherein the effervescent beverage is delivered from a common transportation vessel or from individual transportation vessels respectively provided.

Effect of the Invention

The present invention provides an effervescent beverage containing a grain degradation product, comprising a fermented alcoholic beverage consisting of beer, low-malt beer and other brewed alcoholic beverages, or non-alcoholic malt beverage, wherein foam having a snow-like refreshing texture and a new texture of a prolonged creamy-foam retention is formed on the effervescent beverage upon drinking. The present invention also provides a method for dispensing and a dispenser of the effervescent beverage containing a grain degradation product, wherein tasty foam having a refreshing texture and a new texture of a prolonged creamy-foam retention is formed on the effervescent beverage.

BRIEF DESCRIPTION OF THE DRAWINGS

FIG. 5-1 and FIG. 5-2 are the photographs of the samples prepared by freezing beer bubbles. FIG. 5-3 is the photograph of the frozen foam sample formed by cooling and stirring beer and incorporating the outside gas.

DETAILED DESCRIPTION OF THE INVENTION

Figure 1:
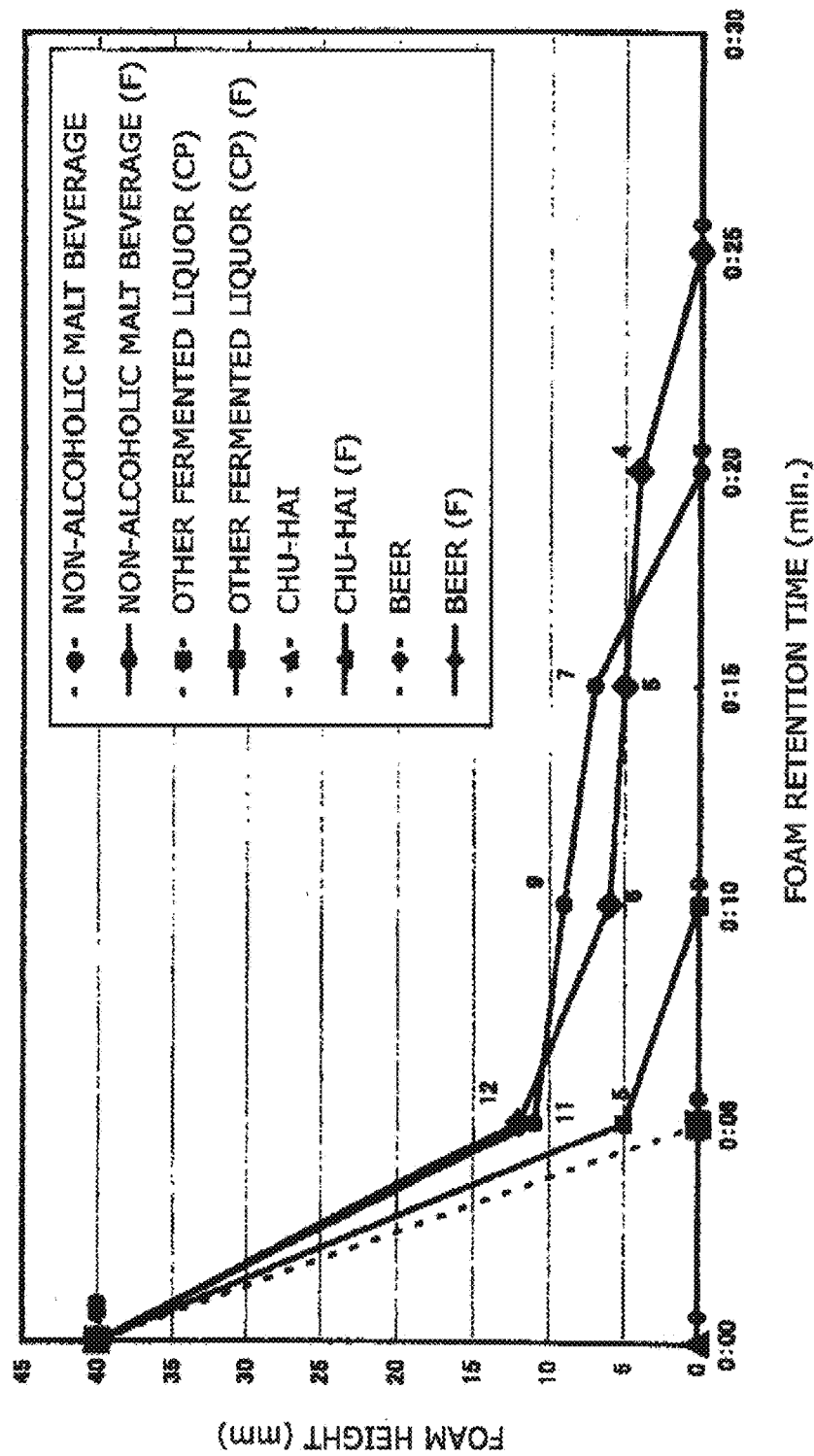
FIG. 1 shows the relationship between foam height (mm) and foam retention time (min.) of each beverage in the evaluation test of foam retention in the examples of the present invention. CP in the figure means that the sample contains corn protein. F means that the frozen foam has been added. Each numerical value in the graph represents the foam height of each beverage.

[Method for Dispensing Effervescent Beverage Containing a Grain Degradation Product]

The present invention provides a method for dispensing an effervescent beverage containing a grain degradation product by cooling effervescent beverage and pouring it into a vessel to serve, wherein foam having a snow-like refreshing texture and a new texture of a prolonged creamy-foam retention is formed on the effervescent beverage, said method comprising:

forming a slurry containing the extract-frozen microparticles by cooling and stirring the effervescent beverage liquid, then preparing the frozen foam of the effervescent beverage containing the extract-frozen microparticles and fine bubbles by cooling and stirring the slurry and incorporating the outside gas into the slurry, and supplying the prepared frozen foam of the effervescent beverage to the effervescent beverage poured into a vessel as a foam component.

Although any type of effervescent beverage containing a grain degradation product may be the subject of the method for dispensing of the present invention, especially preferably beverages containing a degradation product of malt or barley are exemplified. Although grains to be used in the present invention are not particularly limited, barley, wheat, soybean or pea is preferred, barley being more preferred. Although the specific aspect of the degradation product of the grain is not particularly limited, the degradation product of malt, barley, wheat, soybean, pea, or corn, for example, soybean protein, soybean peptide, pea protein and corn protein degradation product are exemplified.

Upon preparation of the effervescent beverage containing a grain degradation product subject to the method for dispensing of the present invention, a conventional foam retention enhancer for the effervescent beverage can be used. Although the foam retention enhancer to be used is not particularly limited, preferred examples include one selected from a group consisting of protein, glycoprotein, bitter substance derived from hop (for example, isohumulone and isocohumulone), saponin, transition metal ion, low molecular weight polyphenol, α-glucan, β-glucan, and pentosan. As a protein to enhance the foam retention, for example, soybean peptide, soybean protein, pea protein, barley protein, corn protein degradation product, octenylsuccinic acid protein, etc. are exemplified.

Specific examples of the effervescent beverage containing a grain degradation product subject to the method for dispensing of the present invention preferably include the effervescent beverage containing malt degradation product, more preferably beer-based beverage. The beer-based beverage means the beverage having a taste and flavor specific to beer obtained when produced by fermentation using yeast and the like, examples of which comprise a fermented malt beverage such as beer, sparkling liquor, liqueur, etc., other fermented liquor, or non-fermented malt beverage such as completely alcohol-free malt beverage (non-alcoholic malt beverage). Alcoholic beverage is preferred from a viewpoint of the subsequent processing, since the frozen alcoholic beverage is softer than frozen non-alcoholic beverage. The beer-based beverage is not particularly limited to malt beverage and the beverage may be in a form of non-barley or non-wheat beverage in which barley, wheat or malt is not used. Examples of the especially preferred aspect of the beer-based beverage comprise a fermented alcoholic beverage consisting of beer, low-malt beer and other fermented liquor, or a non-alcoholic malt beverage.

Examples of "non-barley" or "non-wheat" beverage include beer-like effervescent beverage derived from pea, soybean or corn, the "non-barley" or "non-wheat" beverage including a non-fermented beverage such as completely alcohol-free beverage which does not contain alcohol at all and alcohol-containing beverage. The alcohol-containing beverage is preferable from a viewpoint of foam formation. Examples of the alcohol-containing non-barley or non-wheat beverage include fermented beverage and alcohol-added beverage. Non-barley or non-wheat beverage also includes non-alcoholic fermented beverage obtained by removing low boiling point component and low molecular weight component from fermented beverage.

According to the method for dispensing of the present invention for the effervescent beverage containing a grain degradation product, wherein foam having a refreshing texture and a new texture of a prolonged creamy-foam retention is formed on the effervescent beverage, a chilled-beverage dispensing unit and a foam-dispensing unit may be used, wherein the effervescent beverage liquid delivered from a transportation vessel of the effervescent beverage is chilled and poured into a vessel by using the chilled-beverage dispensing unit, whereas the effervescent beverage liquid delivered from a transportation vessel of the effervescent beverage is cooled and stirred, and the frozen foam of effervescent beverage containing the extract-frozen microparticles and fine bubbles is prepared by cooling and stirring and incorporating the outside gas, and supplied to the effervescent beverage poured to a vessel as a foam component by using the foam-dispensing unit.

The method to supply the foam composed of the frozen foam of the effervescent beverage containing a grain degradation product to the effervescent beverage poured to a vessel as a foam component using the foam-dispensing unit may be performed as follows. The effervescent beverage liquid delivered from the transportation vessel of the effervescent beverage is cooled and stirred by cooling and stirring units which are equipped with a cooling cylinder and a stirring blade such as a screw type stirring blade. Water in the effervescent beverage liquid is frozen by cooling and stirring. When water is frozen, the extract will be consequently concentrated and the viscosity will increase, forming slurry containing the extract-frozen microparticles.

Subsequent cooling and stirring will start incorporating ambient air (outside air), resulting in the occurrence of cubical expansion. Since the air (outside air) incorporated in this process has a lower thermal conductivity than the beverage liquid, the temperature drop will become slower and an inflection point of the temperature drop tendency will appear at the time point of the start of incorporating the air. Further continuation of cooling and stirring with incorporating of outside gas will form the frozen foam of the effervescent beverage with the ambient air (outside air) incorporated to saturation. The frozen foam of the effervescent beverage is composed of the microparticles of frozen water in the beverage liquid, microparticles of extract-frozen in the beverage liquid, and microparticles of the air (outside air), which has a snow-like refreshing texture and a new texture of a prolonged creamy-foam retention upon drinking. The bubbles of the frozen foam of the effervescent beverage is supplied as a foam component to the effervescent beverage poured to a vessel by the chilled-beverage dispensing unit which cools the effervescent beverage liquid delivered from a transportation vessel of the effervescent beverage and allows it to be poured to a vessel.

In the method for dispensing the effervescent beverage of the present invention, it is preferable that the slurry forming step in which the slurry containing the extract-frozen microparticles by cooling and stirring the effervescent beverage liquid and the frozen foam preparing step in which the frozen foam of the effervescent beverage containing the extract-frozen microparticles and the fine bubbles is prepared by cooling and stirring the slurry and incorporating the outside gas, are continuously performed. The operating period for these two steps depends on the stirring temperature, stirring condition, etc. If 3 L of the effervescent beverage containing a grain degradation product (for example, beer) is charged into a cooling and stirring chamber equipped with a cooling cylinder and a stirring blade such as the screw type stirring blade at 5° C. and cooled and stirred at a coolant temperature of −15° C. to −12° C., atmospheric temperature of 22° C. and stirring rate of 30 rpm, the period for stirring and cooling treatment of the two steps is preferably 25 min. or more, more preferably 40 min. or more, more preferably 70 min. or more. In this case, the beverage charged will be stirred and cooled by the coolant to form slurry containing the extract-frozen microparticles by gradual decrease of the temperature. The frozen foam will be prepared by further cooling the slurry, continuing stirring, and incorporating the outside gas.

In the treatment to form the bubbles composed of the frozen foam of the effervescent beverage containing a grain degradation product using the bubble dispensing unit of the present invention, the unit which prepares the frozen foam of the effervescent beverage containing the extract-frozen microparticles and fine bubbles by forming slurry containing the extract-frozen microparticles by cooling and stirring the effervescent beverage liquid, then preparing the frozen foam of the effervescent beverage containing the extract-frozen microparticles and fine bubbles by cooling and stirring the slurry and incorporating the outside gas into the slurry may be controlled based on viscosity, temperature, cubical expansion rate or brightness of the prepared frozen foam of the effervescent beverage.

When the unit which prepares the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas is controlled based on the viscosity of the frozen foam of the effervescent beverage, the viscosity of the prepared frozen foam of the effervescent beverage is adjusted to 0.4 Pa·s to 30 Pa·s, more preferably to 0.7 Pa·s to 30 Pa·s, even more preferably to 1.5 Pa·s to 25 Pa·s, even more preferably to 1.5 Pa·s to 9 Pa·s, further more preferably to 2 Pa·s to 9 Pa·s, further more preferably to 2 Pa·s to 3 Pa·s. By adjusting the viscosity of the frozen foams of the effervescent beverage prepared to 0.4 Pa·s to 30 Pa·s, sustainable frozen foam which has a refreshing texture and which can be smoothly poured out through an outlet such as a bubble outlet is obtained.

When the unit which prepares the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas is controlled based on the temperature of the frozen foam of the effervescent beverage, the temperature of the prepared frozen foam of the effervescent beverage is adjusted to −15° C. to −1.8° C., more preferably to −8° C. to −2.5° C., even more preferably to −8° C. to −3.5° C., even more preferably to −7° C. to −4° C., and furthermore preferably to −4.5° C. to −3.5° C. By adjusting the temperature of the frozen foam of the effervescent beverage prepared to −15° C. to −1.8° C., sustainable frozen foam which has a refreshing texture and which can be smoothly poured out through an outlet such as a bubble outlet is obtained.

When the unit which prepares the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas is controlled based on cubical expansion rate of the frozen foam of the effervescent beverage, the cubical expansion rate of the prepared frozen foam of the effervescent beverage is adjusted to 1.3 to 3.5, more preferably to 1.5 to 3.5, even more preferably to 2 to 3.5, even more preferably to 2 to 3, and furthermore preferably to 2 to 2.5. By adjusting the cubical expansion rate of the frozen foams of the effervescent beverage prepared to 1.3 to 3.5, sustainable frozen foam which has a refreshing texture and which can be smoothly poured out through an outlet such as a bubble outlet is obtained.

When the unit which prepares the frozen foam of the effervescent beverage containing the extract-frozen microparticles and fine bubbles by cooling and stirring the slurry containing the extract-frozen microparticles formed by cooling and stirring the effervescent beverage liquid and incorporating the outside gas is controlled based on brightness of the frozen foam of the effervescent beverage, the difference of the brightness between the prepared frozen foam of the effervescent beverage and the effervescent beverage before freezing:ΔL is adjusted to 8 to 45, more preferably to 30 to 45, even more preferably to 40 to 45, and furthermore preferably to 41 to 44. By adjusting the difference of the brightness of the prepared frozen foam of the effervescent beverage and the effervescent beverage before freezing:ΔL is prepared to 8 to 45, sustainable frozen foam which has a refreshing texture and which can be smoothly poured out through an outlet such as a bubble outlet is obtained.

According to a more preferred aspect of the present invention, the above-mentioned properties, such as viscosity, temperature, cubical expansion rate and brightness difference (ΔL) of the frozen foam of the effervescent beverage may be defined in combination as needed. For example, the frozen foam of the effervescent beverage having a viscosity of 2 Pa·s to Pa·s and a cubical expansion rate of 2 to 2.5 may be exemplified. According to another more preferred aspect of the present invention, the frozen foams of the effervescent beverage having a viscosity of 2 Pa·s to 3 Pa·s, a temperature of −4.5° C. to −3.5° C., cubical expansion rate of 2 to 2.5, and a difference of the brightness between the prepared frozen foam of the effervescent beverage and the effervescent beverage before freezing: ΔL of 41 to 44 are exemplified.

In the treatment to form the bubbles composed of the frozen foam of the effervescent beverage containing a grain degradation product using the foam-dispensing unit of the present invention, the treatment to prepare the frozen foam of the effervescent beverage containing the extract-frozen microparticles and fine bubbles, wherein slurry containing the extract-frozen microparticles is formed by cooling and stirring the effervescent beverage liquid and the frozen foam of the effervescent beverage containing the extract-frozen microparticles and fine bubbles is prepared by cooling and stirring the slurry and incorporating the outside gas into the slurry may be performed using atmospheric air or gas obtained by substituting a part or whole of the atmospheric air with nitrogen, as the outside gas. The nitrogen content may be 1 to 100% of the outside gas, preferably 70 to 100%. Outside gas containing nitrogen enhances sustainability of the bubbles composed of the frozen foam of the effervescent beverage formed.

According to another more preferred aspect of the present invention, the outside gas to be used for the preparation of the frozen foam of the effervescent beverage may contain carbon dioxide. The carbon dioxide content in the outside gas is preferably less than 100%, more preferably less than 90%. Outside gas containing less than 100%, preferably less than 90% of carbon dioxide enhances sustainability of the bubbles composed of the frozen foam of the effervescent beverage formed.

The embodiment of the treatment to form the bubbles composed of the frozen foam of effervescent beverage containing a grain degradation product using the bubble dispensing unit is exemplified as follows: A step to make the frozen foam from the effervescent beverage is performed using a bubble (frozen foam) dispensing device equipped with a stirring blade. For example, the bubble dispensing device is a dispensing device of the bubbles of the frozen foam of the effervescent beverage equipped with a cooling unit and a pressure tank. The cooling and stirring chamber has a cooling cylinder combined with a cooling unit. The cooling cylinder is equipped with a cylindrical evaporator and a screw type stirring blade arranged to the evaporator. The effervescent beverage containing a grain degradation product is cooled and stirred by the steps of freezing the effervescent beverage on the surface of the evaporator of the cooling cylinder and scraping off the frozen effervescent beverage with the screw type stirring blade, wherein slurry containing the extract-frozen microparticles is formed first. Further cooling and stirring of the slurry causes increase of the viscosity of the slurry, causing incorporating of outside gas. Creamy bubbles of the frozen foam of the effervescent beverage containing the extract-frozen microparticles and fine bubbles are formed by the cooling and stirring treatment and incorporating the outside gas. Entire treatment of cooling and stirring and incorporating the outside gas, is preferably performed in the gas containing 1 to 100% of nitrogen, more preferably 70 to 100%. As a preferred embodiment performed in a gas containing 70 to 100% of nitrogen, for example, the treatment may be performed in a composition same as or similar to the atmospheric air (same composition as the atmospheric air means about 76 to 80% of nitrogen, about 19 to 23% of oxygen, and argon, carbon dioxide, etc.). More preferably, the treatment is performed under a pressure of 0.01 to 0.5 MPa, more preferably 0.01 to 0.1 MPa, inter alia 0.02 to 0.07 MPa in the atmospheric air and/or in nitrogen. Composition similar to the atmospheric air means that the nitrogen content of the gas is, for example, 70 to 99% (oxygen content about 1 to 29%), preferably 70 to 95% (oxygen content about 4 to 29%), more preferably 70 to 85% (oxygen content about 14 to 29%), even more preferably 70 to 80% (oxygen content about 19 to 29%), further more preferably 70 to 75% (oxygen content about 24 to 29%), in which at least nitrogen and oxygen are contained. It is advantageous to perform the dispensing method of the present invention in the composition same as the atmospheric air, since the nitrogen gas cylinder and the like is not necessary, leading to significant cost reduction.

In an embodiment of the present invention, the same effervescent beverage containing a grain degradation product may be used for the chilled-beverage dispensing unit by which the effervescent beverage delivered from a transportation vessel of the effervescent beverage is cooled and poured to a vessel and for the foam dispensing unit by which the frozen foam of the effervescent beverage is supplied to the effervescent beverage poured out to a vessel. Otherwise, different effervescent beverages may be used for the chilled-beverage dispensing unit and the foam-dispensing unit.

[Dispenser of Effervescent Beverage Containing a Grain Degradation Product]

The present invention provides a dispenser of the effervescent beverage containing a grain degradation product, wherein foam having a snow-like refreshing texture and a new texture of a prolonged creamy-foam retention is formed on the effervescent beverage, wherein the dispenser is equipped with a chilled-beverage dispensing device which cools the effervescent beverage delivered from a transportation vessel of the effervescent beverage and to allows it to be poured into a vessel and the foam-dispensing device equipped with:

a unit which forms slurry containing extract-frozen microparticles by cooling and stirring the effervescent beverage liquid delivered from the transportation vessel of the effervescent beverage, a unit which prepares the frozen foam of the effervescent beverage containing the extract-frozen microparticles and fine bubbles by cooling and stirring the slurry and incorporating the outside gas into the slurry, a unit which detects the preparation of the frozen foam of the effervescent beverage containing the extract-frozen microparticles and fine bubbles formed by cooling and stirring the slurry and incorporating the outside gas into the slurry, and a unit which supplies the prepared frozen foam of the effervescent beverage to the effervescent beverage poured into a vessel as a foam component.

Figure 6:
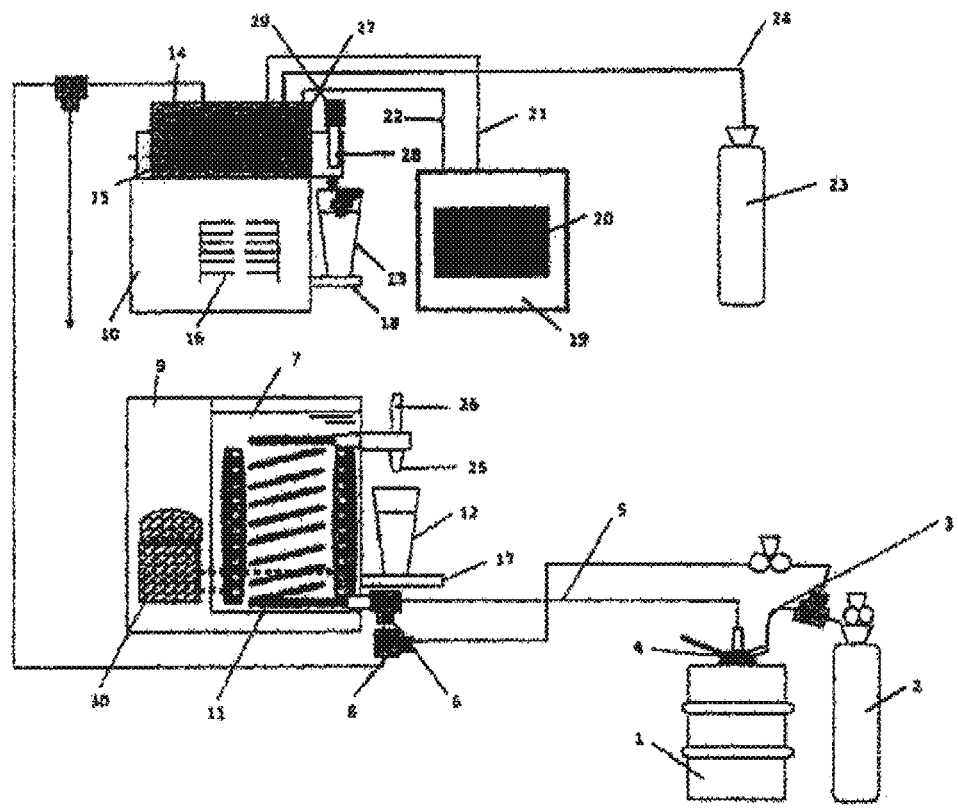
FIG. 6 is a schematic diagram of the device in the exemplary dispensing device for the effervescent beverage containing a grain degradation product of the present invention.
Figure 7:
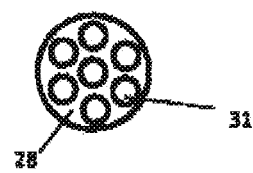
FIG. 7 shows an embodiment of the cross section of the dispenser outlet (28) through which the frozen foam is poured out from the exemplary dispensing device for the effervescent beverage containing a grain degradation product of the present invention.

As shown in FIG. 6, which is a schematic diagram of the present invention, the dispenser of the present invention is constituted from the chilled-beverage dispensing device (A) to cool the effervescent beverage liquid delivered from the transportation vessel of the effervescent beverage and to pour it to a vessel, and the foam dispensing-device (B) to cool and stir the effervescent beverage liquid delivered from the transportation vessel of the effervescent beverage, to prepare the frozen foam of the effervescent beverage containing the extract-frozen microparticles and fine bubbles by cooling and stirring and incorporating the outside gas, and to supply the frozen foam to the effervescent beverage poured into a vessel as a foam component.

The chilled-beverage dispensing device (A) comprises a cooling vessel 9 which contains a cooler 7 equipped with a cooling unit such as a cooling coil. The effervescent beverage delivered from a transportation vessel of the effervescent beverage such as a beer barrel 1 is chilled by the cooler 7 and poured into a vessel such as a beer mug a12 through a chilled-beer outlet 25. A lever such as a chilled-beer outlet lever 26 is operated to pour the effervescent beverage.

The foam-dispensing device (B) comprises a cooling vessel equipped with a cooling and stirring chamber 14 composed of a cooling cylinder 27 and screw type stirring blade 15. The effervescent beverage delivered from a transportation vessel of the effervescent beverage such as a beer barrel 1 is cooled and stirred in the cooling and stirring chamber 14 and the frozen foam of the effervescent beverage containing the extract-frozen microparticles and fine bubbles is formed by cooling and stirring and incorporating the outside gas. The frozen foam is supplied to a vessel such as a beer mug b13, which contains the effervescent beverage poured using the chilled-beverage dispensing device (A), through a foam outlet 28 as a foam component. A lever such as a foam outlet lever 29 is operated to pour the frozen foam.

The foam-dispensing device (B) may be equipped with a connector the cooling and stirring chamber 14 with a nitrogen gas cylinder 23 to substitute the whole or a part of the outside gas of the chamber 14 with nitrogen. In addition, the cooling and stirring chamber 14 may be equipped with a unit which detects the preparation of the frozen foam of the effervescent beverage containing the extract-frozen microparticles and the fine bubbles formed by cooling and stirring slurry, involving outside gas, such as a viscosity confirmation-cooling sensor 21. A unit which presses the outside gas in the chamber may be provided in the cooling and stirring chamber 14 (not shown).

The effervescent beverage dispenser of the present invention, constructed as mentioned above, wherein foam having a snow-like refreshing texture and a new texture of a prolonged creamy-foam retention is formed on the effervescent beverage, by pouring the chilled effervescent beverage from the chilled-beverage dispensing device (A) to a vessel and pouring the frozen foam prepared in the foam-dispensing device (B) from this device to the effervescent beverage contained in the vessel. In the dispenser of the present invention, the chilled effervescent beverage poured into a vessel and the frozen foam may be prepared from the same effervescent beverage by using the same transportation vessel for the chilled-beverage dispensing device (A) and the foam-dispensing device (B). Otherwise, the chilled effervescent beverage poured into a vessel and the frozen foam may be prepared from the different effervescent beverages by using the different transportation vessels for the chilled-beverage dispensing device (A) and the foam-dispensing device (B).

The present invention will be described more specifically referring to the examples. The technological scope of the present invention is not limited to these examples.

EXAMPLES

Example 1

[Evaluation Test 1 for Foam Retention Time]

After pouring 220 mL each of the samples of beer, non-alcoholic malt beverage, other fermented liquor (containing corn protein, CP), and chu-hai (shochu with tonic water) to a 300 mL glass, the foam height was measured over time at an outside temperature of 20° C. Meanwhile, after pouring 220 mL each of the samples of beer, non-alcoholic malt beverage, other fermented liquor (containing corn protein, CP), and chu-hai to a 300 mL glass, frozen foam of each sample was prepared by using the foam-dispensing device shown in FIG. 6 (without air pressurization). Forty grams each of the prepared frozen foam was poured over the beverage of the same origin as the frozen foam. After stirring, the foam height was measured over time at an outside temperature of 20° C. The results are shown in FIG. 1.

[Evaluation Test 2 of Foam Retention Time]

Figure 2:
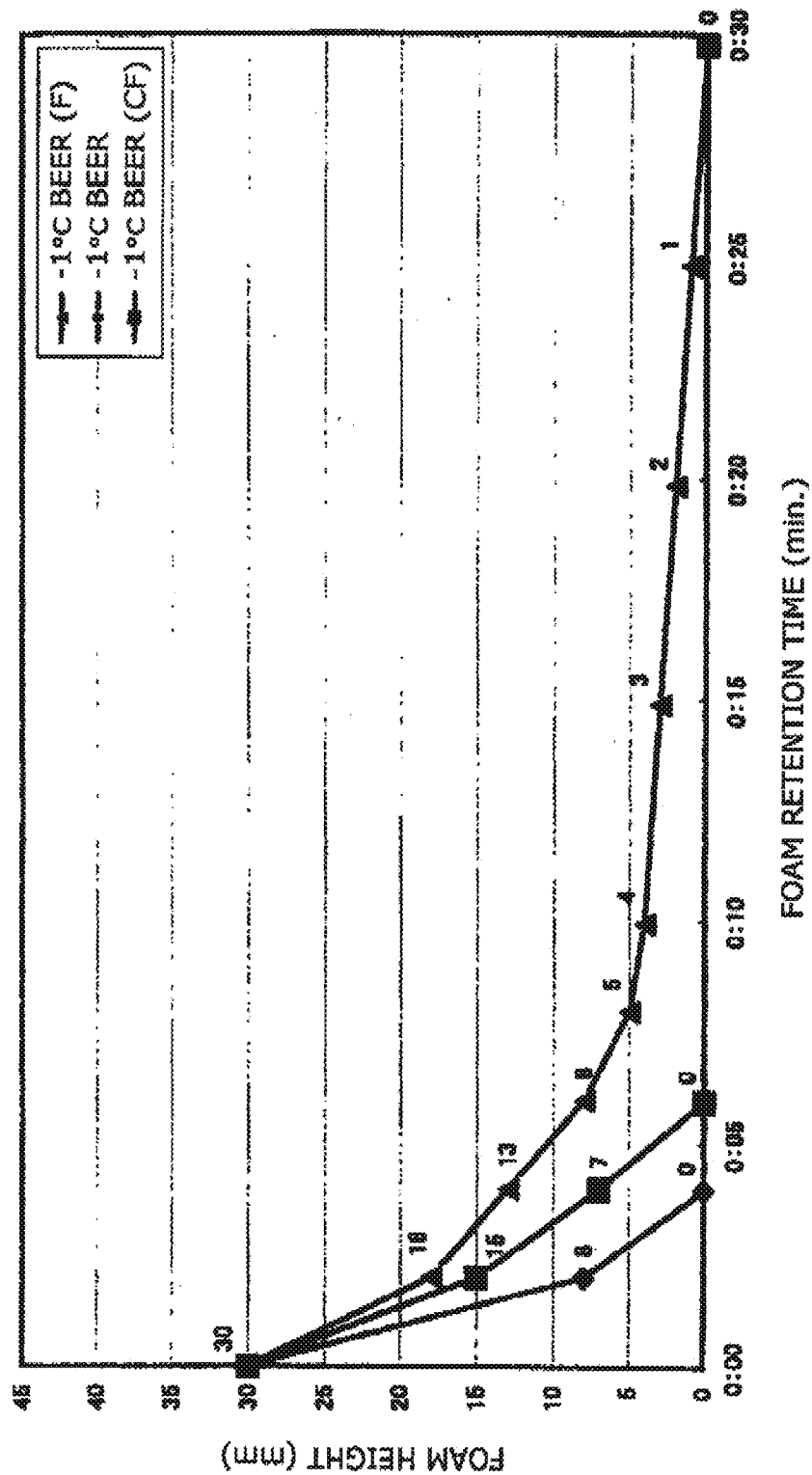
FIG. 2 shows the relationship between foam height (mm) and foam retention time (min.) of each beverage in the evaluation test of foam retention in the examples of the present invention. CF in the figure means the group to which frozen and coarsely crushed beer has been added. F means the group to which frozen foam of beer has been added. Each numerical value in the graph represents the foam height of each beverage.

After pouring 220 mL of beer at a temperature of −1° C. to a 300 mL glass, the foam height was measured over time at an outside temperature of 20° C. Meanwhile, after pouring 220 mL of beer at a temperature of −1° C. to a 300 mL glass, 40 g of the same beer which was frozen and finely crashed was poured over the beer. After stirring, the foam height was measured over time at an outside temperature of 20° C. (CF). Furthermore, after pouring 220 mL of beer at a temperature of −1° C. to a 300 mL glass, the frozen foam of the beer was prepared by using the foam-dispensing device shown in FIG. 6 (without air pressurization). Forty grams of the prepared frozen foam was poured over the same beer. After stirring, the foam height was measured over time at an outside temperature of 20° C. (F). The results are shown in FIG. 2.

[Exploratory Test for Conditions to Prepare the Frozen Foam]

Figure 3:
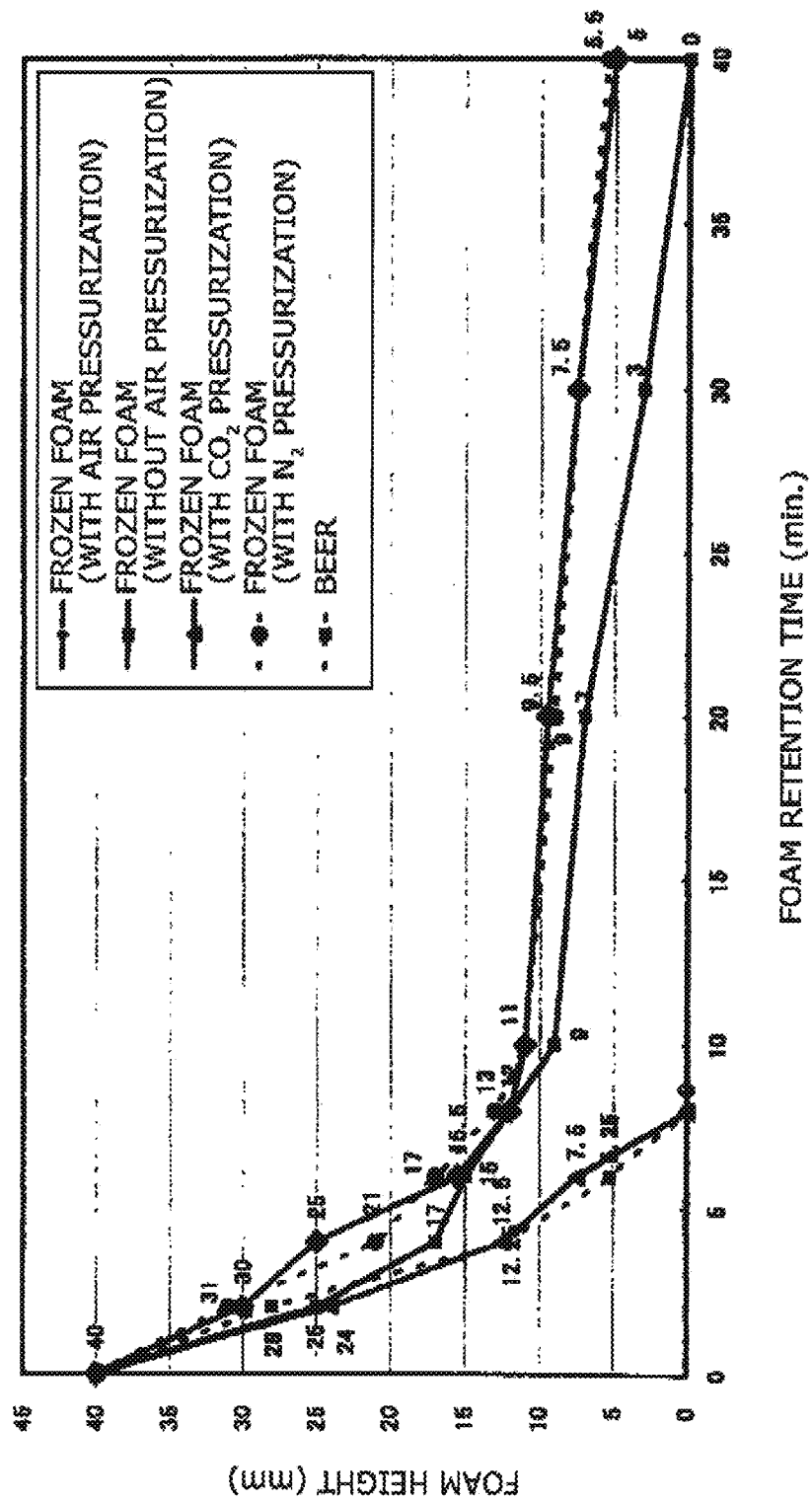
FIG. 3 shows the relationship between foam height (mm) and foam retention time (min.) for the beverage containing frozen foam prepared under five different conditions in the exploratory test for conditions to prepare the frozen microparticles in the examples of the present invention. Each numerical value in the graph represents the foam height of each beverage.
Figure 4:
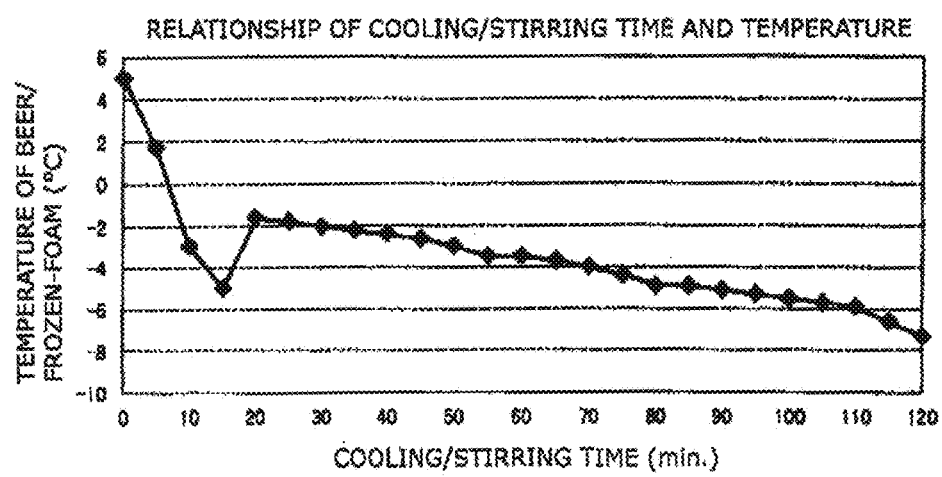
FIG. 4 shows the relationship between the cooling and stirring time and the temperature of beer/frozen-foam in the test regarding cooling and stirring of the effervescent beverage and formation and property change of the frozen foam in the examples of the present invention.

Whether the foam height is dependent on the conditions of gas in the tank of the foam-dispensing device was examined. Specifically, the difference in the foam height according to the difference in the five conditions below was examined. The foam height of the foam prepared according to the five conditions below was measured over time at an outside temperature of 20° C. The results are shown in FIG. 3.

(1) The tank of the foam-dispensing device shown in FIG. 6, fed with gas and pressurized at 0.05 MPa by air, was charged with 1600 mL of beer and frozen foam was prepared. Forty grams of the frozen foam prepared was poured over 220 mL of beer (1.2° C.) contained in a 300 mL glass and the mixture was stirred (Frozen foam/with air pressurization).

(2) The tank of the foam-dispensing device shown in FIG. 6, fed with gas without pressurization by air, was charged with 1600 mL of beer and frozen foam was prepared. Forty grams of the frozen foam prepared was poured over 220 mL of beer (1.2° C.) contained in a 300 mL glass and the mixture was stirred (Frozen foam/without air pressurization).

(3) The tank of the foam-dispensing device shown in FIG. 6, fed with $CO_2$ gas and pressurized at 0.05 MPa by air, was charged with 1600 mL of beer and frozen foam was prepared. Forty grams of the frozen foam prepared was poured over 220 mL of beer (1.2° C.) contained in a 300 mL glass and the mixture was stirred (Frozen foam/with $CO_2$ pressurization).

(4) The tank of the foam-dispensing device shown in FIG. 6, fed with $N_2$ gas and pressurized at 0.05 MPa by air, was charged with 1600 mL of beer and frozen foam was prepared. Forty grams of the frozen foam prepared was poured over 220 mL of beer (1.2° C.) contained in a 300 mL glass and the mixture was stirred (Frozen foam/with $N_2$ pressurization).

(5) To a 300 mL glass was poured 220 mL of beer (1.2° C.) and the beer was further poured into the glass until the foam was filled to the top of the glass.

Example 2

[Change in Physical Property of Frozen Foam Depending on Cooling and Stirring]

<Test Method>

Formation and change in physical property of the frozen foam depending on cooling and stirring of the effervescent beverage was tested. Commercially available beer was used as the effervescent beverage. The cooler was initially charged with 3 L of beer at a temperature of 5° C. The beer was cooled and stirred at an outside temperature of 26.0° C., coolant temperature of the cooler of −15° C. to −12° C. and at a rotation speed of 30 rpm. The atmospheric air was used as the outside gas for the preparation of the frozen foam. In the property change measurement, the viscosity was measured using a viscometer (Single cylindrical rotation viscometer, TVB10M; Spindle M4×30 rpm, manufactured by Toki Sangyo, Co., Ltd.). "Brightness difference" was measured using a color difference meter (CR400, manufactured by Konica-Minolta, Co., Ltd.).

<Result>

The measurement results are shown in Table 1. It is shown that the cubical expansion rate of the frozen foam starts increasing at about 25 minutes of cooling and stirring and that the air outside the beverage starts to be incorporated among the extract-frozen microparticles by cooling and stirring.

TABLE 1

| | COOLING AND STIRRING TIME (MINUTES) | | | | | | | | | | | | |
| --- | --- | --- | --- | --- | --- | --- | --- | --- | --- | --- | --- | --- | --- |
| | 0 | 5 | 10 | 15 | 20 | 25 | 30 | 35 | 40 | 45 | 50 | 55 | 60 |
| TEMPERATURE (° C.) | 5.0 | 1.7 | −3.0 | −5.0 | −1.6 | −1.8 | −2.0 | −2.2 | −2.4 | −2.6 | −3.0 | −3.5 | −3.5 |
| VISCOSITY (Pa · s) | 0.01 | 0.01 | 0.01 | 0.01 | 0.27 | 0.41 | 0.54 | 0.55 | 0.60 | 0.66 | 0.80 | 0.90 | 1.04 |
| CUBICAL EXPANSION RATE (TIMES) | 1.00 | 1.00 | 1.00 | 1.03 | 1.03 | 1.26 | 1.62 | 1.62 | 1.60 | 1.62 | 1.78 | 1.92 | 2.12 |
| BRIGHTNESS DIFFERENCE | 0.0 | 0.0 | 0.0 | 0.0 | 0.0 | 7.7 | 15.6 | 20.1 | 25.0 | 30.0 | 32.9 | 35.0 | 37.6 |
| FOAM RETENTION TIME (MINUTES) | | | | | | | | | 14 | | | | 27 |

| | COOLING AND STIRRING TIME (MINUTES) | | | | | | | | | | | |
| --- | --- | --- | --- | --- | --- | --- | --- | --- | --- | --- | --- | --- |
| | 65 | 70 | 75 | 80 | 85 | 90 | 95 | 100 | 105 | 110 | 115 | 120 |
| TEMPERATURE (° C.) | −3.7 | −4.0 | −4.4 | −4.9 | −4.9 | −5.1 | −5.3 | −5.5 | −5.7 | −5.9 | −6.6 | −7.3 |
| VISCOSITY (Pa · s) | 1.63 | 1.65 | 1.95 | 2.25 | 2.28 | 4.58 | 4.90 | 5.29 | 5.92 | 10.70 | 11.90 | 26.50 |
| CUBICAL EXPANSION RATE (TIMES) | 2.15 | 2.32 | 2.35 | 2.46 | 2.53 | 2.63 | 2.62 | 2.68 | 2.66 | 2.70 | 2.69 | 2.70 |

TABLE 1-continued

| BRIGHTNESS DIFFERENCE | 38.8 | 39.2 | 40.7 | 40.9 | 41.4 | 41.5 | 40.8 | 41.7 | 41.3 | 41.3 | 41.3 | 42.9 |
|---|---|---|---|---|---|---|---|---|---|---|---|---|
| FOAM RETENTION TIME (MINUTES) | | | | 42 | | | | 44 | | | | 45 |

Example 3

[Foam Retention Test of Frozen Beer Foam]
<Test Method>

Foam retention test was performed for the frozen bubbles prepared by freezing the beer foam and the frozen bubbles (bubbles of frozen foam) formed by cooling and stirring the beer and incorporating the outside gas. Samples of "the frozen beer bubbles" were prepared by placing a half-cut aluminum can at the center of a stainless mug, pouring beer with bubbles in it, and freezing the beer bubbles by filling the surroundings with liquid nitrogen. Samples of "the frozen bubbles formed by cooling and stirring the beer and incorporating the outside gas" were prepared using the device of the present invention shown in FIG. 6.
<Results>

Figure 5:
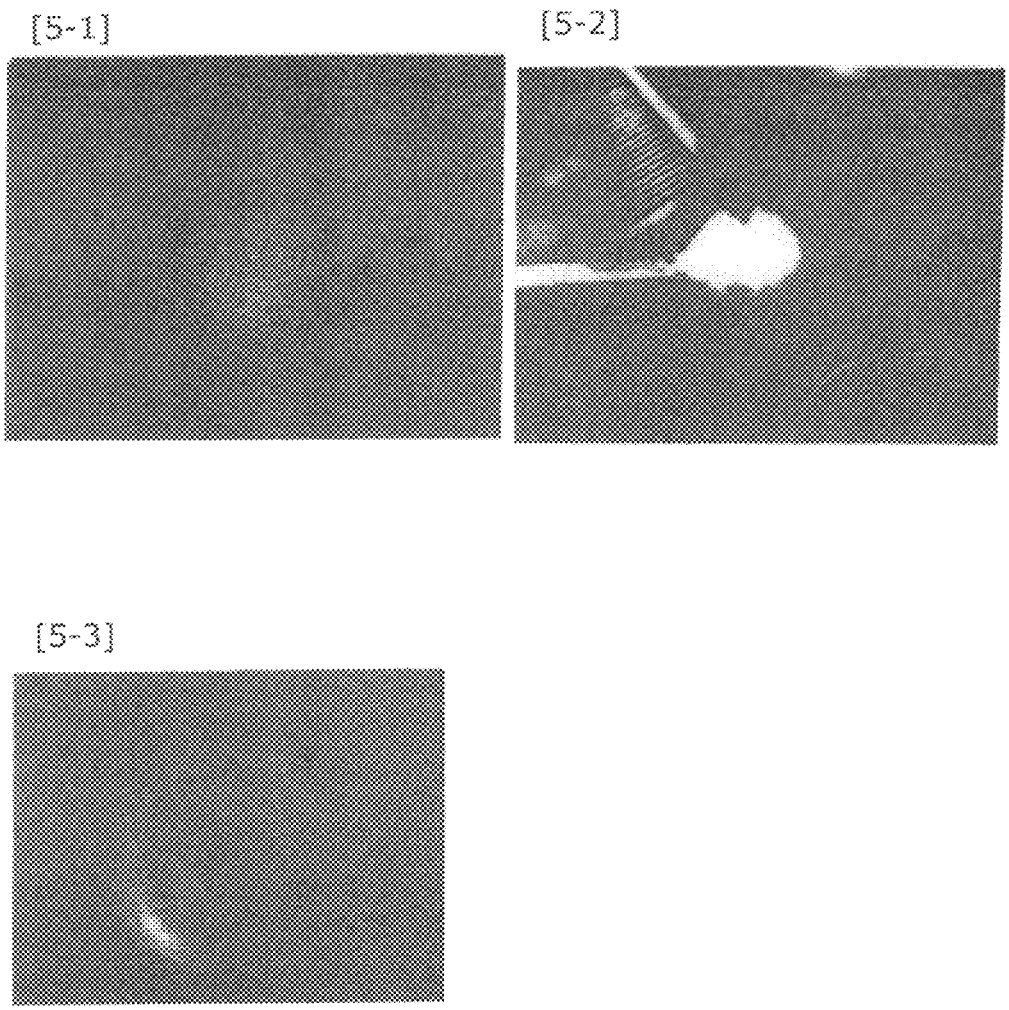
FIG. 5 is a photograph showing the results of foam retention test of "frozen bubbles prepared by freezing beer bubbles" and "frozen bubbles (bubbles of frozen foam) formed by cooling and stirring beer and incorporating the outside gas" in the foam retention test of frozen beer bubbles in the examples of the present invention.

Results are shown in FIG. 5 (photographs). FIG. 5-1 and FIG. 5-2 are the photographs of the samples prepared by freezing beer bubbles. FIG. 5-3 is the photograph of the frozen bubbles (bubbles of frozen foam) sample formed by cooling and stirring beer and incorporating the outside gas. The samples prepared by freezing the beer bubbles were sherbet-like and the frozen foam does not have the effect of foam retention. Meanwhile, the frozen bubbles sample (bubbles of frozen foam) formed by cooling and stirring the beer and incorporating the outside gas, was snow-like and had the effect of prolonged foam retention.

Example 4

[Sensory Evaluation of the Frozen Foam]

The frozen foam prepared from the beer using the foam-dispensing device shown in FIG. 6 (without air pressurization) or the coarsely crashed ice made by freezing the beer was added over the beer which was poured into a 300 mL glass. Sensory evaluation was performed for each of the samples by 12 participants.

Compared to the beer containing the frozen foam, the foam of the beer containing the coarsely crashed ice made by freezing the beer was coarse and vanished rapidly, and the beer itself was evaluated to be too cool. Therefore, the beer containing frozen foam having a texture of a creamy-foam retention was not obtained. Meanwhile, the beer containing the frozen foam prepared by the method of the present invention was evaluated to have a snow-like refreshing texture. Further, the beer containing the frozen foam was evaluated to have creamy and new texture and significantly improved foam retention.

INDUSTRIAL APPLICABILITY

The present invention provides an effervescent beverage containing a grain degradation product, comprising a fermented alcoholic beverage consisting of beer, low-malt beer and other brewed alcoholic beverages, or a non-alcoholic malt beverage, which contains foam having a snow-like refreshing texture and a new texture of a prolonged creamy-foam retention upon drinking. The present invention also provides a method for dispensing and a dispenser of the effervescent beverage containing a grain degradation product, wherein tasty foam having a refreshing texture and a new texture of a prolonged creamy-foam retention.

DESCRIPTION OF THE SYMBOLS

A. Chilled-beverage dispensing device
B. Foam-dispensing device
1. Beer barrel
2. Carbon dioxide cylinder
3. Carbon dioxide feeding line
4. Dispense head
5. Beer supply line
6. Three-way valve 1
7. Cooler
8. Three-way valve 2
9. Cooling vessel of beer dispenser
10. Cooling vessel of foam-dispensing device
11. Beverage path
12. Mug a
13. Mug b
14. Cooling and stirring chamber
15. Screw type stirring blade
16. Cooling unit
17. Bent stage 1
18. Bent stage 2
19. Control box
20. Touch panel
21. Detecting unit for frozen microparticles (viscosity confirmation-cooling sensor)
22. Charge control sensor
23. Nitrogen gas cylinder
24. Nitrogen feeding line
25. Chilled-beer outlet of beer dispenser
26. Chilled-beer outlet lever of beer dispenser
27. Cooling cylinder
28. Foam outlet of the foam-dispensing device
29. Foam outlet lever of the foam-dispensing device
30. Compressor
31. Small openings

The invention claimed is:

1. A method for dispensing an effervescent beverage containing a grain degradation product comprising:
    cooling and stirring an effervescent beverage liquid to form a slurry containing extract-frozen microparticles;
    cooling and stirring the slurry such that outside gas containing nitrogen is incorporated into the slurry, to prepare frozen foam of the effervescent beverage containing the extract-frozen microparticles and fine bubbles, wherein the prepared frozen foam has a cubical expansion rate of 1.5 to 3.5; and
    supplying the prepared frozen foam to an effervescent beverage poured into a vessel, as a foam component.

2. The method according to claim 1, wherein the cubical expansion rate of the prepared frozen foam is 2 to 3.5.

3. The method according to claim 1, wherein in the process to prepare the frozen foam, the outside gas is incorporated into the slurry to saturation.

4. The method according to claim 1, wherein the outside gas is atmospheric air.

5. The method according to claim 1, wherein the process of cooling and stirring is performed using cooling and stirring units, and wherein said units are equipped with a cooling cylinder and a stirring blade.

6. The method according to claim 1, wherein the effervescent beverage comprises at least one beverage selected from the group consisting of: an alcoholic beer, an alcoholic low-malt beer, a brewed alcoholic beverage, and a non-alcoholic malt beverage.

\* \* \* \* \*